(12) United States Patent
Garbagnati

(10) Patent No.: US 6,814,224 B2
(45) Date of Patent: Nov. 9, 2004

(54) MOLD FOR CONVEYOR-CHAIN LINKS AND LINK

(75) Inventor: Carlo Garbagnati, Castello Brianza (IT)

(73) Assignee: Regina Sud S.p.A., Borgo San Michele (IT)

( * ) Notice: Subject to any disclaimer, the term of this patent is extended or adjusted under 35 U.S.C. 154(b) by 12 days.

(21) Appl. No.: 10/370,607

(22) Filed: Feb. 24, 2003

(65) Prior Publication Data

US 2003/0178289 A1 Sep. 25, 2003

(30) Foreign Application Priority Data

Mar. 20, 2002 (IT) ..................................... MI2002A0586

(51) Int. Cl.⁷ ......................... B65B 17/06; B65B 17/38
(52) U.S. Cl. ..................................... 198/852; 198/853
(58) Field of Search ............................. 198/850, 851, 198/852, 853

(56) References Cited

U.S. PATENT DOCUMENTS

| | | | | | |
|---|---|---|---|---|---|
| 4,958,726 | A | * | 9/1990 | Fett et al. ..................... | 198/852 |
| D332,213 | S | * | 1/1993 | Woyach et al. ............... | D8/499 |
| 5,697,492 | A | * | 12/1997 | Damkj.ae butted.r ....... | 198/852 |
| 6,189,686 | B1 | * | 2/2001 | Shibayama et al. ......... | 198/853 |
| 6,601,697 | B2 | * | 8/2003 | Steeber et al. ............ | 198/844.1 |

* cited by examiner

*Primary Examiner*—Gene O. Crawford

(57) ABSTRACT

For the realization of a molded link (11) for a conveyor chain of the type individualizing a conveyance plane below which is a joint body from which guiding tabs project laterally and parallel to the conveyance plane a mold (10) comprising a molding chamber (17) individualizing the conveyance plane, the joint body and the link guiding tabs is proposed. Sliding boxes (18, 19) with ends which mold cavities (16) in the lower face of the link conveyance plane enter into the molding chamber (17).

15 Claims, 4 Drawing Sheets

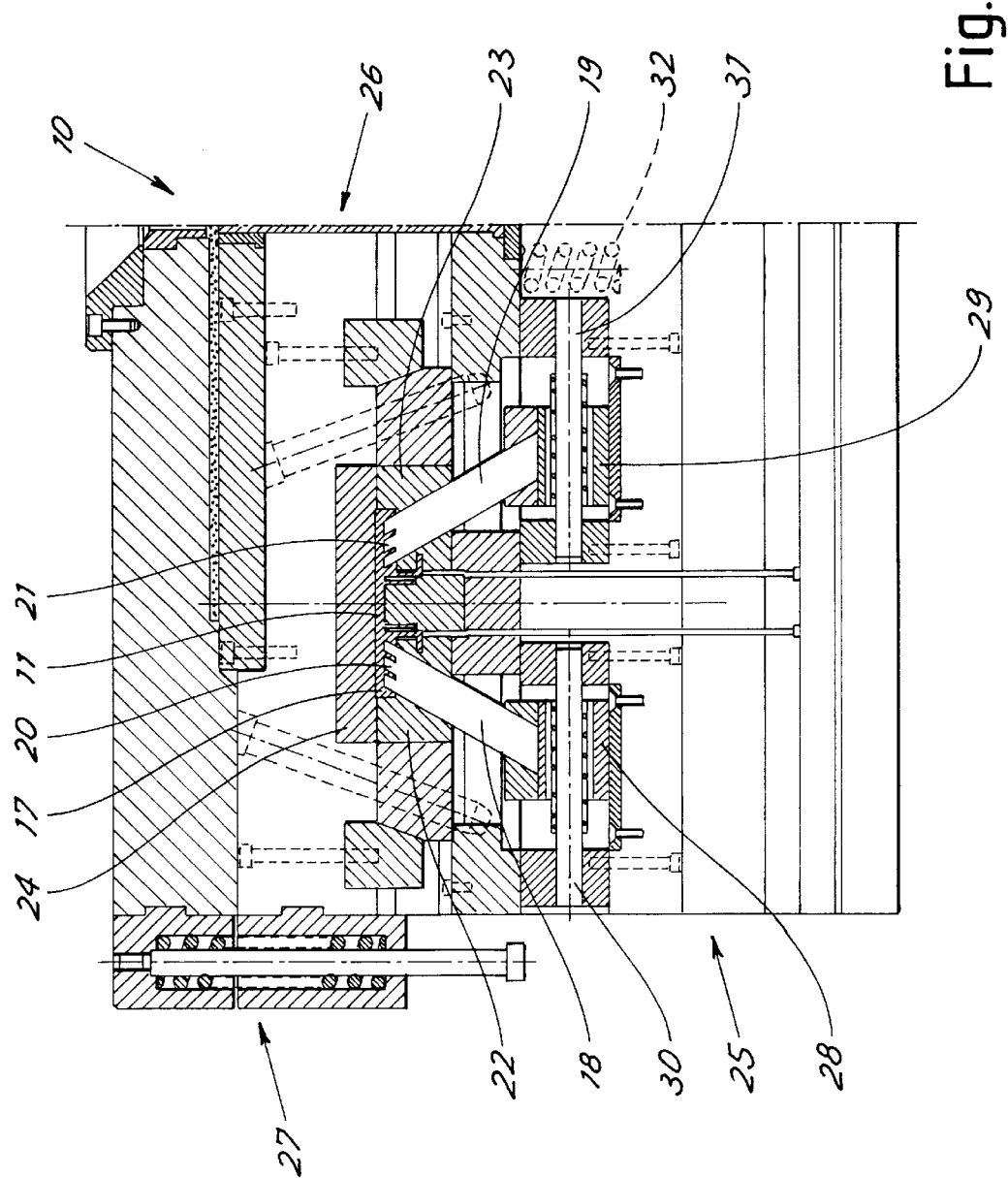

Tav. IV

MOLD FOR CONVEYOR-CHAIN LINKS AND LINK

BACKGROUND OF THE INVENTION

The present invention relates to innovative chain links for conveyors of the type termed 'tab'. The present invention also relates to a mold for the realization of said chain links. In the prior art, chain conveyors of the type termed 'tab' in which each link of the chain defines on top a part of the conveyance plane of the conveyor below which is a joint articulation between the links and guiding tabs within the chain running channel are well known.

To respect the geometrical standards of chains and belts common on the market and give consideration to the need to obtain transfer of the product between curved and straight sections of the installation the conveyance planes of the chain are in general realized with relatively great thickness. In chains molded from plastic material it was however found that this involves problems of obtaining satisfactory flatness of the conveyance plane. Molding of the conveyance plane is also complicated by the fact that beneath and parallel thereto the guiding tabs designed to engage in the chain running channel project laterally from the central body of the link.

The general purpose of the present invention is to remedy the above mentioned shortcomings by making available a mold giving more satisfactory flatness of the conveyance surface of a tab-type link while keeping the structure simple and strong and the weight of the single plates low in comparison with known chains. Another purpose is to make available a link having improved characteristics of flatness and reduced weight.

SUMMARY OF THE INVENTION

In view of this purpose it was sought to provide in accordance with the present invention a mold for the realization of a molded link for a conveyor chain of the type individualizing a conveyance plane beneath which there is a joint body from which guiding tabs project laterally and parallel to the conveyance plane comprising a molding chamber which identifies the conveyance plane, the joint body and the link guiding tabs characterized in that in said chamber there enter sliding boxes with cavity-molding ends in the lower face of the conveyance plane with said boxes being inclined with respect to the conveyance plane to be fitted in the lower face thereof without interfering with the underlying guiding tabs.

Again in accordance with the present invention it was also sought to realize a molded link for a conveyor chain of the type individualizing a conveyance plane beneath which is a joint body from which guiding tabs project laterally and parallel to the conveyance plane characterized in that in the lower face of the conveyance plane there are cavities which are inclined with respect to the conveyance plane perpendicular so that their imaginary extension towards the exterior of the conveyance plane does not intersect said underlying guiding tabs.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings:

FIG. 1 shows a cross section view of a mold realized in accordance with the present invention in closed position.

DETAILED DESCRIPTION OF THE INVENTION

With reference to the figures, FIG. 1 shows a cross section of a mold realized in accordance with the present invention and designated as a whole by reference number 10. The mold shown can be considered one half of a two-pit mold for simultaneous molding of two links. The other half would be specular. For the sake of simplicity reference is made below to a single link.

Figure 6:
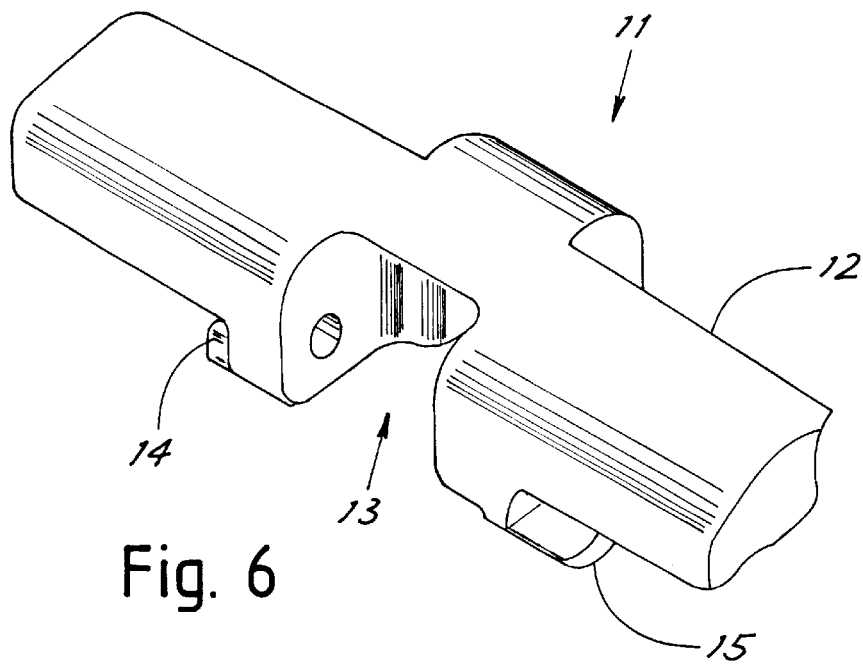
FIGS. 6 and 7 show respectively upper and lower perspective views of a link in accordance with the present invention.
Figure 7:
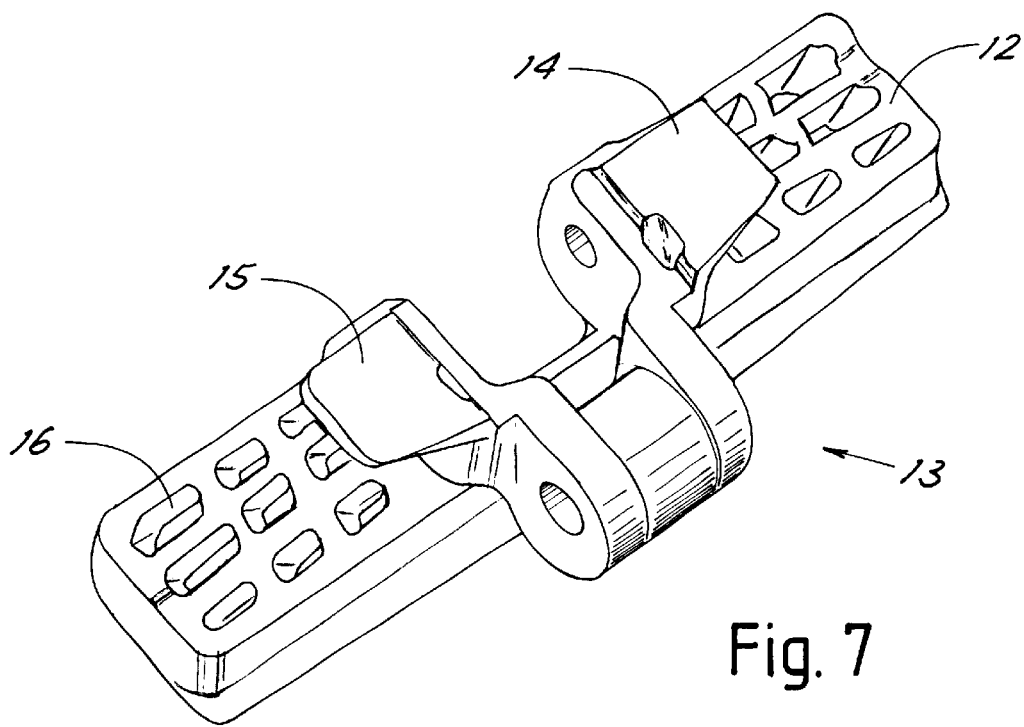

The mold is conceived for the realization of a molded link 11 for a conveyor chain as shown by way of example in FIGS. 6 and 7. The molded link is the type which individualizes a conveyor plane 12 beneath which is a joint body 13 from which guiding tabs 14, 15 project laterally and parallel to the conveyance plane. The guiding tabs are used for engaging appropriately in a known manner in a running channel of the chain (not shown).

As may be seen in FIG. 7, in the lower face of the conveyance plane there are cavities 16 which are inclined with respect to the conveyance plane perpendicular so that their imaginary extension towards the exterior of the conveyance plane does not intersect said underlying guiding tabs. The inclination of the cavities with respect to the transport plane perpendicular is advantageously between 10° and 40°.

The cross section of the link is seen well in FIG. 1 where it is also seen that the mold has a molding chamber 17 which identifies the conveyance plane, the joint body and the link guiding tabs. Into the chamber 17 slide boxes 18, 19 which have ends 20, 21 shaped for molding the cavities 16 in the lower face of the conveyance plane. Advantageously, as inferred also from FIG. 7, the ends are shaped to produce cavities arranged in rows and columns transversely and longitudinally to the extension of the conveyance plane and the resulting cavities in the link have a rectangular cross section.

The boxes are inclined with respect to the conveyance plane to fit into the lower face thereof without interfering with the underlying guiding tabs.

In particular, the boxes are two in number inclined opposingly on the two sides of the joint body in such a manner as to fit with the ends between the tabs and the conveyance plane. The inclination of the boxes with respect to the molded link conveyance plane perpendicular is advantageously between 10° and 40°.

Each box 18 or 19 penetrates into the molding chamber through a respective lower half-mold 22, 23 which realizes a respective lateral part of the link. The two half-molds are separable laterally to shake out the molded link. The mold also comprises an upper member 24 for molding the upper face of the link and separable vertically from the two lower half-molds for shaking out the molded link.

For opening and closing movement, the mold comprises essentially three parts, to wit, a base or lower part 25, an intermediate part 26 and an upper part 27.

The intermediate part comprises the two half-molds 22, 23 while to the base part are constrained the boxes by means of a pair of slides 28, 29 which are movable horizontally along respective guides 30, 31 on the base part.

Figure 3:
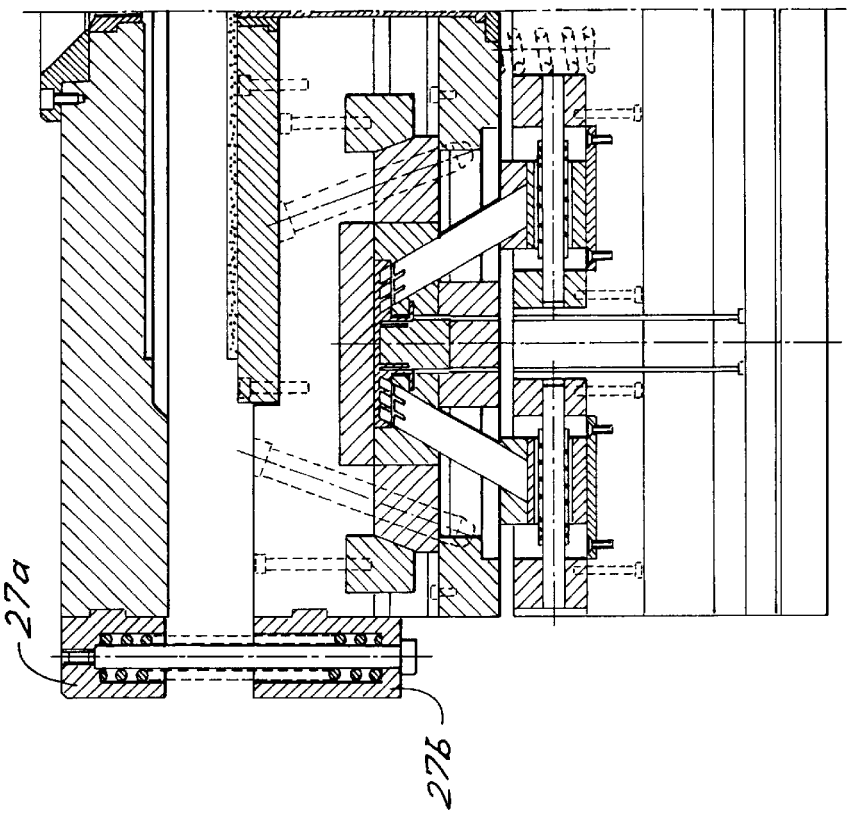
FIGS. 2 to 5 show successive phases of the opening of the mold.
Figure 2:
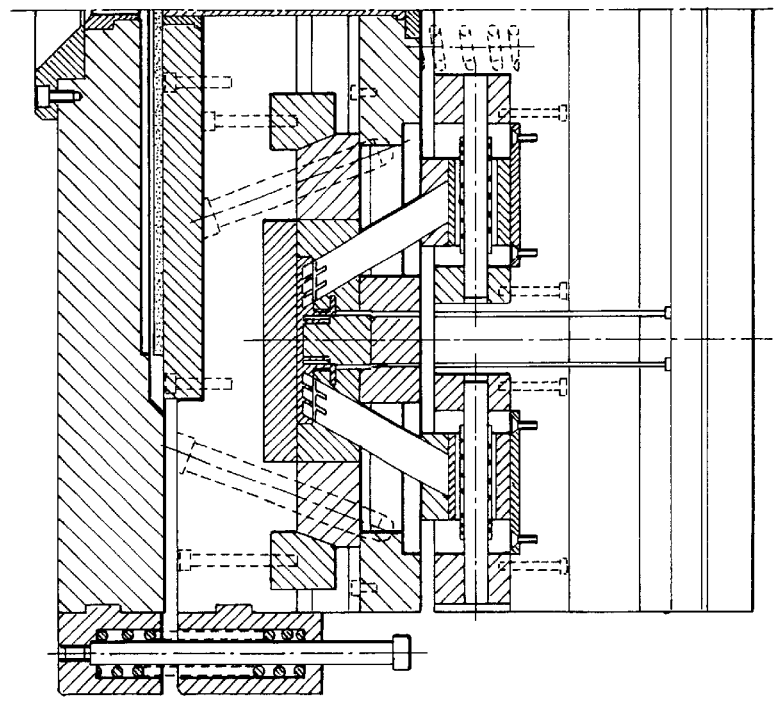

The lower and intermediate parts are elastically movable to withdraw from each other through springs of which one 32 is shown diagrammatically in the figures. The withdrawal travel is such that, in fully separated position (FIG. 2) the boxes are fully withdrawn from the molding chamber thanks to the possibility of free running of the slides 28, 29.

Figure 4:
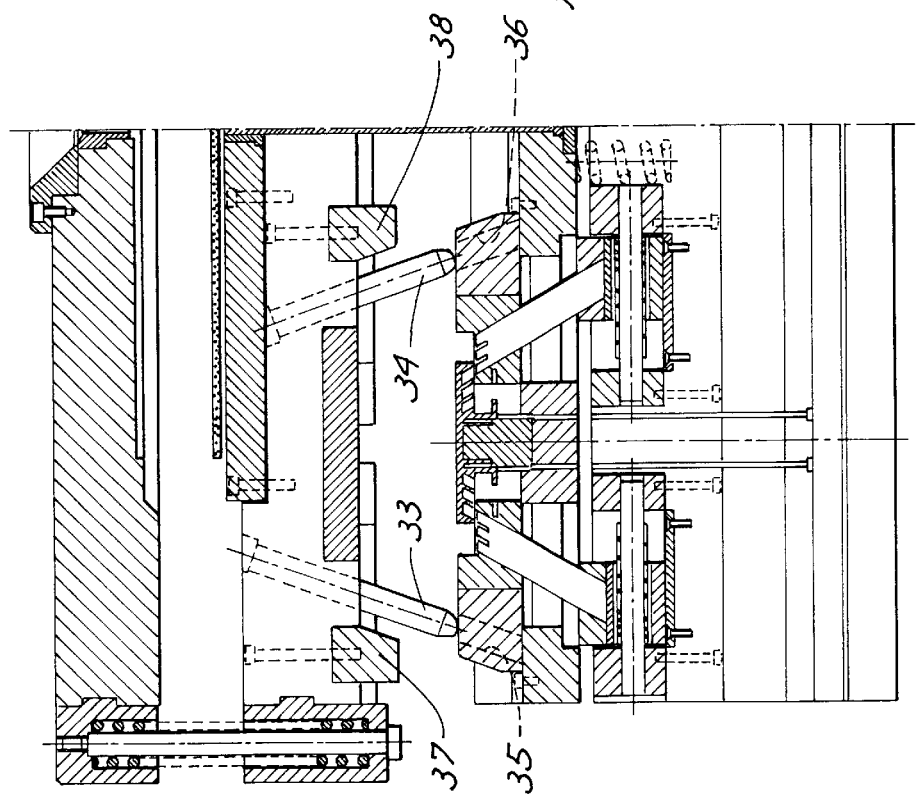

The two half-molds 22, 23 are assembled on the intermediate part 26 in a manner sliding in a horizontal direction so as to be able to move laterally between the adjacent position (closed mold, FIG. 1) and the far position (mold open, FIG. 4). The translation movement of the half-molds (including the boxes) to the open position is caused by the lifting of the upper part 27 which leads to the slipping out of inclined pegs 33, 34 from seats 35, 36 in the body of the half-molds with the resulting lateral thrust. As may be seen in FIG. 1, with the molds closed, blocks 37, 38 fitted on the top of the mold keep the half-molds thrust towards each other by appropriated inclined surfaces.

Figure 5:
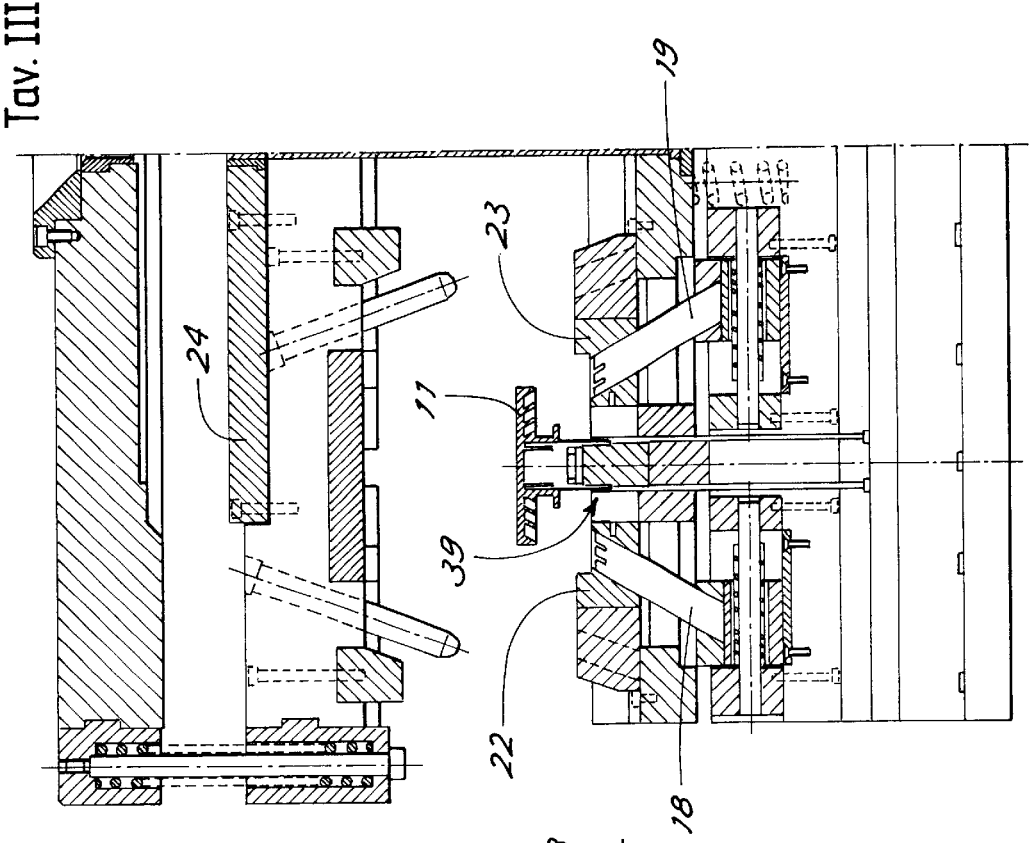

In operation the mold is closed to the position of FIG. 1 by thrust (thanks to known press means not shown) of the upper part towards the lower part. After the link is molded, lifting of the upper part leads in sequence to, first, withdrawal of the inclined boxes (FIG. 2), then extraction of the core by separation into two elastically connected parts 27a and 27b of the upper part 27 and lastly to full opening and falling of the riser (FIG. 4). As shown in FIG. 5, expulsion of the molded detail is secured by a sliding ejector 39 which raises the link from the mold (FIG. 5).

Reclosing of the mold then takes place by again drawing together the lower part 25 and upper part 27 with resulting engagement of the pegs 33, 34 in their respective seats so as to again bring close the half-molds and juxtaposition again of the lower and intermediate parts 25, 26 so as to bring about entry of the boxes into the molding chamber.

The structure and operation of the mold are now clear. Said mold has an advantageously simple structure, a reduced number of moving parts and facilitated opening and closing. As may be seen in FIGS. 6 and 7 the link obtained has the lower part of the conveyance plane endowed with the above mentioned cavities opposingly inclined outwardly on both sides of the join body. Advantageously the cavities are sized to sink into the thickness of the conveyance plane for at least half thereof.

It was found that a link realized with inclined cavities to form ribs as described above has better flatness of the plate or conveyance plane than 'tab' links of known type without lower undercuttings and relatively thick. Improvements in flatness are recognizable in both the upper and lower parts of the plate. In particular, optimal flatness of the upper surface allows an optimal condition of conveyance and shifting of products while an excellent flatness of the lower surface produces more uniform wear than that obtainable with conventional plates.

Naturally the above description of an embodiment applying the innovative principles of the present invention is given by way of non-limiting example of said principles within the scope of the exclusive right claimed here. For example the mold will have means and channels for inlet of the fluid state plastic. Such means and channels are not described here as they are virtually prior art and readily imaginable to those skilled in the art. The mold could also be the hydraulic type or similar in addition to fully mechanical.

What is claimed is:

1. A mold for the realization of a molded link for conveyor chains of the type individualizing a conveyance plane beneath which there is a joint body from which guiding tabs project laterally and parallel to the conveyance plane comprising a molding chamber which identifies the conveyance plane, the joint body and the guiding tabs of the link characterized in that in said chamber there enter running boxes with cavity molding ends in the lower face of the conveyance plane with said boxes being inclined with respect to the conveyance plane to be fitted in the lower face thereof without interfering with the underlying guiding tabs.

2. Mold in accordance with claim 1 characterized in that the boxes have ends shaped to produce cavities arranged in rows and columns transversely and longitudinally to the extension of the conveyance plane.

3. Mold in accordance with claim 1 characterized in that the cavities have a rectangular cross section.

4. Mold in accordance with claim 1 characterized in that the boxes are two opposingly inclined on both sides of the joint body.

5. Mold in accordance with claim 4 characterized in that the inclination of the boxes with respect to the molded link conveyance plane perpendicular is between 10° and 40°.

6. Mold in accordance with claim 1 characterized in that the boxes penetrate into the chamber each one through a corresponding lower half-mold which realizes a respective side part of the link with the two half-molds being separable laterally for shaking out of the molded link.

7. Mold in accordance with claim 6 characterized in that the mold comprises an upper member for molding of the upper face of the link separable vertically from the two lower half-molds for shaking out of the molded link.

8. Mold in accordance with claim 7 characterized in that for the mutual separation and closing movements of the two half-molds the upper member comprises appropriately inclined pegs which engage in corresponding seats in the half-molds to generate a thrust in the direction of movement of the half-molds upon separation movement from or closing of the upper member on the half-molds during opening or closing respectively of the mold.

9. Mold in accordance with claim 6 characterized in that the boxes are constrained to respective slides running transversely along guides supported by a lower part of the mold which is elastically movable vertically between a pulled-to position and a separated position with respect to an intermediate part of the mold supporting the half-molds in a sliding manner with upon mold opening movement said intermediate and lower parts elastically withdrawing in the mold opening direction to bring about inclined retraction of the boxes from the molding chamber.

10. Molded conveyor-chain link of the type individualizing a conveyance plane beneath which is a joint body from which guiding tabs project laterally and parallel to the conveyance plane characterized in that in the lower face of the conveyance plane are cavities inclined to the conveyance plane perpendicular so that their imaginary extension outward from the conveyance plane does not intersect said underlying guiding tabs.

11. Link in accordance with claim 10 characterized in that the cavities are inclined opposingly and outwardly on the two sides of the joint body.

12. Link in accordance with claim 10 characterized in that the cavities are arranged in rows and columns transversely and longitudinally to the conveyance plane extension to individualize a grid of ribs between them.

13. Link in accordance with claim 10 characterized in that the cavities have a rectangular cross section.

14. Link in accordance with claim 10 characterized in that the cavities sink into the thickness of the conveyance plane for at least half thereof.

15. Link in accordance with claim 10 characterized in that the inclination of the cavities to the conveyance plane perpendicular is between 10° and 40°.

* * * * *